(12) United States Patent
Su et al.

(10) Patent No.: US 10,119,872 B1
(45) Date of Patent: Nov. 6, 2018

(54) TEMPERATURE INTERFERENCE-FREE SENSING FIBER MONITORING APPARATUS AND APPLICATION METHOD THEREFOR

(71) Applicant: HOHAI UNIVERSITY, Nanjing, Jiangsu (CN)

(72) Inventors: Huaizhi Su, Jiangsu (CN); Meng Yang, Jiangsu (CN); Chongshi Gu, Jiangsu (CN); Zheng Fang, Jiangsu (CN)

(73) Assignee: Hohai University, Nanjing, Jiangsu (CN)

( * ) Notice: Subject to any disclaimer, the term of this patent is extended or adjusted under 35 U.S.C. 154(b) by 0 days.

(21) Appl. No.: 15/834,539

(22) Filed: Dec. 7, 2017

(51) Int. Cl.
  *G01L 1/26* (2006.01)
  *G02B 6/36* (2006.01)
  *G01L 1/24* (2006.01)

(52) U.S. Cl.
  CPC .............. *G01L 1/26* (2013.01); *G01L 1/242* (2013.01); *G02B 6/3616* (2013.01)

(58) Field of Classification Search
  CPC ......... G01L 1/26; G01L 1/242; G01L 9/0011; G01L 9/0079; G01L 11/02; G01D 5/268; G01D 5/35316; G02B 6/3616

USPC ........................................................... 73/800
See application file for complete search history.

(56) References Cited

U.S. PATENT DOCUMENTS 9,810,594 B2 * 11/2017 Sanzari ................ G01L 9/0079

\* cited by examiner

*Primary Examiner* — Jonathan Dunlap
*Assistant Examiner* — Octavia Hollington
(74) *Attorney, Agent, or Firm* — Rankin, Hill & Clark LLP

(57) ABSTRACT

A temperature interference-free sensing fiber monitoring apparatus and application method therefor including a vacuum cavity module, a composite material flat groove module and a port fiber-fixing module, wherein the vacuum cavity module is connected with the composite material flat groove module via an glue-injection square groove, and the port fiber-fixing module is connected with the vacuum cavity module via a foursquare plug body; a sensing fiber orderly passes through the composite material flat groove module, the vacuum cavity module and the port fiber-fixing module; the vacuum cavity module, the composite material flat groove module and the port fiber-fixing module are all fixed on a temperature interference-free base platform.

7 Claims, 1 Drawing Sheet

TEMPERATURE INTERFERENCE-FREE SENSING FIBER MONITORING APPARATUS AND APPLICATION METHOD THEREFOR

TECHNICAL FIELD

The present invention relates to a temperature interference-free sensing fiber monitoring apparatus and application method therefor, and belongs to the field of hydraulic engineering safety health monitoring.

BACKGROUND

A fiber sensing technology is a novel sensing technology developed in recent several decades, which uses an optical wave as a sensing signal and uses a fiber as a transmission carrier to sense and detect external monitored signals, and has the advantages on the aspects of sensing manner, sensing principle, signal detection and processing that the traditional electric sensor does not have. Compared with a traditional sensing component, the fiber sensing technology has the advantages of good anti-electromagnetic interference, chemical resistance, and radio resistance performances; moreover, the fiber sensing technology has no electric charge, is small in volume, is light in mass, and is easy to bend, etc.

When the sensing fiber is affected by environmental factors like external strain and temperature, the optical wave transmitted in the fiber is easy to be modulated by these external fields or factors, so as to result in changes on optical wave characterization parameters, such as the changes of light intensity, phase position, frequency, polarization state, etc. The information of an external monitored factor may be obtained through monitoring the changes of the information, which brings a big trouble to the monitoring of the sensing fiber. If the factors causing the interference and effects outside cannot be determined through the changes of the optical wave characterization parameters, then the environmental factors cannot be singly analyzed preferably, and the proportion of each affecting factor cannot be recognized as well, so that targeted evaluation cannot be preferably conducted. Therefore, it is necessary to establish an instrument for filtering some external factors in advance.

The most common factor is the mutual interference influence between the strain and the temperature, and it only needs to consider the single strain condition under multiple conditions, but the temperature effect is extremely obvious in actual condition. Multiple temperature interference-free or temperature compensation measures are very inaccurate at present, and there is no relatively reasonable scheme; and in addition, the method is too simple. Therefore, it is very important to develop a temperature interference-free sensing fiber monitoring apparatus.

When the stress-strain numerical value of a structure is merely obtained under an actual working environment, it is difficult to avoid the effects of temperature inside and outside the structure. Regarding to the structure to be monitored, the interference of multiple complicated factors outside causes that the structure to be monitored represents multiple complicated external information, and the external information is the fusion body of the internal information of the structure to be monitored. According to the external information extracted, even through multiple advanced data optimization algorithms are used, it is relatively difficult to accurately separate and recognize the information that is concealed in the structure to reflect the structure, which needs to start from a monitoring apparatus to develop a monitoring instrument that may eliminate some disturbing factors.

SUMMARY

Object of the invention: in order to overcome the defects in the prior art, the present invention provides a temperature interference-free sensing fiber monitoring apparatus and application method therefor, which eliminates the effect of temperature interference on the monitoring aspect, i.e., fusing and constructing the composite material flat groove module for temperature compensation, which has high monitoring precision.

Technical solution: in order to achieve the object above, a temperature interference-free sensing fiber monitoring apparatus according to the present invention comprises a vacuum cavity module, a composite material flat groove module and a port fiber-fixing module, wherein the vacuum cavity module is connected with the composite material flat groove module, the port fiber-fixing module is connected with the vacuum cavity module via a foursquare plug body, a sensing fiber orderly passes through the composite material flat groove module, the vacuum cavity module and the port fiber-fixing module, the vacuum cavity module, the composite material flat groove module and the port fiber-fixing module are all fixed in an installation tube, and the installation tube is located on a temperature interference-free base platform;

the composite material flat groove module comprises a cylinder made of special composite material, the center of the cylinder is provided with a through hole for the sensing fiber to pass through, the top of the cylinder is provided with a pressing cover, and the center of the pressing cover is provided with a concavoconcave glue-injection groove;

the vacuum cavity module comprises a vacuum cavity and an elastic fastening outer ring, one end of the vacuum cavity is connected with a cover plate, the cover plate is fixed in an installation tube through glue, the other end of the vacuum cavity is connected with the elastic fastening outer ring, the center of the elastic fastening outer ring is provided with a circular hole, the circular hole is internally provided with a hard fiber protection outer layer, the bottom end of the elastic fastening outer ring is provided with a conical hole, the conical hole is internally installed with the foursquare plug body, the foursquare plug body is extended with a cylindrical boss, the cylindrical boss is located in the hard fiber protection outer layer, the sensing fiber passes through the cylindrical boss, the vacuum cavity is connected with a vacuum-pumping apparatus outside the installation tube, and the sensing fiber passes through the cover plate, the vacuum cavity and the foursquare plug body in sequence; and the port fiber-fixing module comprises a left arc-shaped pressing body and a right arc-shaped pressing body, one end of the left arc-shaped pressing body and one end of the right arc-shaped pressing body are respectively hinged with the bottom end of the elastic fastening outer ring, the other end of the left arc-shaped pressing body and the other end of the right arc-shaped pressing body are respectively extended with a boss, the boss is provided with a connecting apparatus, the arc-shaped surfaces of the left arc-shaped pressing body and the right arc-shaped pressing body are set oppositely, the left arc-shaped pressing body and the right arc-shaped pressing body form an arc-shaped pressing cavity, and the sensing fiber passes through the arc-shaped pressing cavity.

Preferably, the vacuum-pumping apparatus comprises a vacuum pump and an air valve, the vacuum cavity is connected with the air valve through a pipeline, and the vacuum pump is installed in the air valve.

Preferably, a vacuum degree sensor is installed in the pipeline.

Preferably, the connecting apparatus comprises a transverse frame connecting shaft, both of the two bosses are provided with a through hole, and the transverse frame connecting shaft is locked by a tightness control cap after passing through the two through holes.

Preferably, the numerical value of the product of the difference between the thermal expansion coefficient of the cylinder and the thermal expansion coefficient of the sensing fiber in the cylinder with the strain value of the corresponding section of sensing fiber is no more than 1.03 times of the numerical value of the temperature coefficient of the corresponding section sensing fiber.

Preferably, both the two sides of the temperature interference-free base platform are provided with a clamping groove.

An application method of the temperature interference-free sensing fiber monitoring apparatus above comprises the following steps of:

first step: configuring a sensing fiber used for distributed monitoring, firstly passing the sensing fiber through the port fiber-fixing module, the vacuum cavity module and the composite material flat groove module in sequence, and then leading the sensing fiber led out into a second temperature interference-free sensing fiber monitoring apparatus to pass through the composite material flat groove module, the vacuum cavity module and the port fiber-fixing module in sequence;

second step: connecting the two bosses to the transverse frame connecting shaft in series through the transverse frame connecting shaft, rotating the tightness control cap on the transverse frame connecting shaft, controlling the tightness control cap to rotate inwardly, and fixing the sensing fiber in the arc-shaped pressing cavity through a bulge between the left arc-shaped pressing body and the right arc-shaped pressing body to form a vibration wire form;

third step: configuring the hard fiber protection outer layer and the elastic fastening outer ring from inside to outside, fixing the cover plate in the installation tube through glue to form an airtight cavity, and fixing the sensing fiber on the cover plate through glue as well, wherein the vacuum cavity section is in an external temperature interference-free state at the moment, the stress-strain numerical value obtained in the vacuum cavity section is the numerical value after removing the temperature interference effect, and recorded as the strain numerical value monitored by the temperature interference-free sensing fiber for the first time;

fourth step: placing the cylinder on the cover plate, wherein the product of the difference between the thermal expansion coefficient of the special composite material of the cylinder and the thermal expansion coefficient of the sensing fiber in the special composite material with the strain value of the corresponding section of sensing fiber is no more than 1.03 times of the temperature coefficient of the corresponding section of sensing fiber; and injecting glue in the concavoconcave glue-injection groove to fix the sensing fiber passing through the concavoconcave glue-injection groove, wherein the stress-strain numerical value generated by an external load and obtained by the sensing fiber in the cylinder at the moment is the numerical value after removing the temperature interference effect, and is recorded as the strain numerical value monitored by the temperature interference-free sensing fiber monitoring for the second time; and fifth step: getting the average value of the numerical value generated by the external load and monitored by the sensing fiber in the vacuum cavity and the cylinder, repeating the third step and the fourth step, obtaining the average value of a multiple groups of strain numerical values, wherein the result of the average value of the strain numerical values complies with the normal distribution law, and the numerical value of a place corresponding to the maximum probability is used as a final monitoring result.

The present invention builds the composite material flat groove module for temperature compensation, initially proposes the temperature interference-free vacuum cavity module, assembles the vacuum cavity module with the composite material flat groove module, and develops the sensing fiber monitoring apparatus equipped with multiple modules capable of mutual correction; achieves efficient temperature interference-free effects via multi-layer mutual correction, and can provide important guarantee for practical monitoring of stress-strain behaviors of an actual structure.

The arrangement forms of the sensing fiber are various, including the point mode monitoring and distributed monitoring, and the present invention aims at the distributed monitoring, which needs a large scope arrangement of the sensing fiber, and multiple apparatuses of the present invention are required in the sensing fiber needing to be arranged. Therefore, a plurality of the apparatuses need to be connected, and may be placed on the surface of the concrete or the interior of the concrete.

Beneficial effects: the temperature interference-free sensing fiber monitoring apparatus of the present invention breaks through the idea of temperature interference-free in traditional meaning, builds the composite material flat groove module for temperature compensation in a fusion manner, initially puts forward the temperature interference-free vacuum cavity module, creatively and integratedly applies the vacuum cavity module and the composite material flat groove module, and develops the sensing fiber monitoring apparatus based on the multi-module mutual correction temperature interference-free technology, which eliminates the effect of the temperature interference of sensing fiber from monitoring level, and may truly reflect the stress-strain behaviors in the structure monitored. Moreover, the apparatus has the advantages of simple structure, convenient arrangement and flexible operation, greatly increases the application and promotion ability of the distributed sensing fiber technology in actual engineering, and has extremely high actual engineering application value.

Wherein: 200 refers to left arc-shaped pressing sharp handle, 201 refers to right arc-shaped pressing sharp handle, 202 refers to tightness control cap, 203 refers to transverse frame connecting shaft, 204 refers to left arc-shaped pressing body, 205 refers to right arc-shaped pressing body, 206 refers to sensing fiber, 207 refers to arc-shaped pressing cavity, 208 refers to foursquare plug body, 209 refers to hard fiber protection outer layer, 210 refers to right connecting clamping groove, 212 refers to elastic fastening outer ring, 214 refers to air valve, 215 refers to vacuum pump, 216 refers to vacuum cavity, 217 refers to cover plate, 218 refers to pressing cover, 219 refers to cylinder, 220 refers to concavoconcave glue refers to injection groove, 221 refers to left connecting clamping groove, 222 refers to clamping groove fixing plug, and 223 refers to temperature interference-free base platform.

DETAILED DESCRIPTION

The present invention is further described hereinafter with reference to the drawings.

Figure 1:
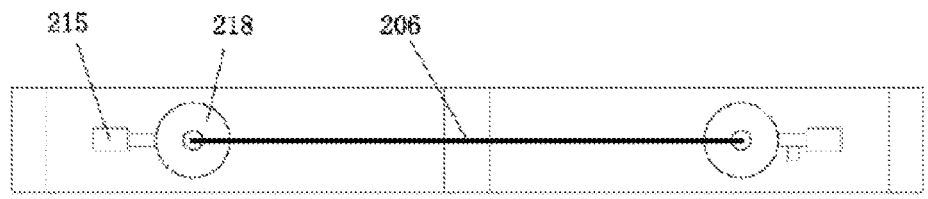
FIG. 1 is a front view diagram of the present invention.
Figure 2:
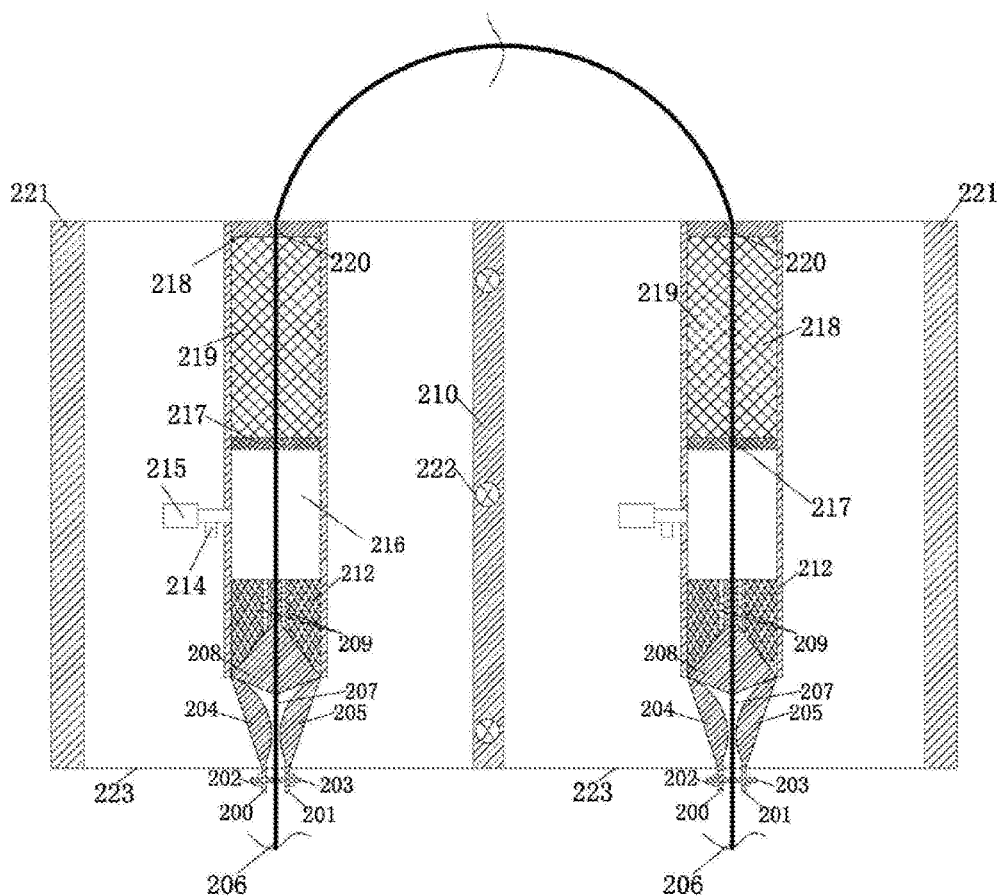
FIG. 2 is a section view diagram of FIG. 1.

As shown in FIG. 1 and FIG. 2, a temperature interference-free sensing fiber monitoring apparatus according to the present invention comprises a vacuum cavity module, a composite material flat groove module and a port fiber-fixing module, wherein the vacuum cavity module is connected with the composite material flat groove module through a cover plate 217 with a length of 2 cma side length of 2 cm, the port fiber-fixing module is connected with the vacuum cavity module through a foursquare plug body with a length of 2 cm between each peak, the composite material flat groove module is connected with the port fiber-fixing module through a temperature interference-free base platform with a length of 30 cm, a height of 5 cm and a width of 20 cm, two adjacent temperature interference-free sensing fiber monitoring apparatuses are connected through a left connecting clamping groove 221 with a length of 30 cm and a width of 4 cm, a right connecting clamping groove 210 with a length of 30 cm and a width of 4 cm, and a clamping groove fixing plug 222 with a height of 6 cm and a diameter of 1 cm.

A TPU-type hard fiber protection outer layer 209 and a TPEE-type elastic fastening outer ring 212 with a diameter of 5 cm are respectively covered outside a GJJV tight-buffered sensing fiber 206 in sequence from inside to outside in the vacuum cavity module, the TPU-type hard fiber protection outer layer 209 mainly and effectively fixes the GJJV tight-buffered sensing fiber 206 in the vacuum cavity module with a length of 10 cm and a diameter of 5 cm, the main function of the TPEE-type elastic fastening outer ring 212 is to protect the TPU-type hard fiber protection outer layer 209, and the TPEE-type elastic fastening outer ring 212 and the cover plate 217 form a cavity structure, which is a vacuum cavity 216 with a length of 10 cm and a diameter of 5 cm. The vacuum cavity 216 is connected with a vacuum-pumping apparatus outside the installation tube, the vacuum-pumping apparatus comprises a vacuum pump 215 and an air valve 214, the vacuum cavity 216 is connected with the air valve 214 through a pipeline, the vacuum pump 215 is installed in the air valve, and a vacuum degree sensor is installed in the pipeline. The vacuum degree in the vacuum cavity 216 is detected through the vacuum sensor, and when the vacuum degree in the vacuum cavity 216 reaches the requirement, the vacuum pump 215 is stopped to work and the air valve is closed.

The material of the cylinder 219 made of special composite material in the composite material flat groove module is a special resin matrix composite material, and the tail end of the cylinder 219 made of special resin matrix composite material is provided with an arc-shaped concavoconcave glue-injection groove 220. In the embodiment, the special composite material 219 of the special resin matrix composite material is embedded in the installation tube, and it is regulated that the product of the difference between the thermal expansion coefficient of the special resin matrix composite material and the thermal expansion coefficient of the GJJV tight-buffered sensing fiber 206 in the special resin matrix composite material with the strain value of the corresponding section of GJJV tight-buffered sensing fiber 206 is equal to the temperature coefficient of the corresponding section of GJJV tight-buffered sensing fiber 206.

Both a left arc-shaped pressing body 204 and a right arc-shaped pressing body 205 in the port fiber-fixing module are structures made of hard material, with a radian of $\pi/3$, the left arc-shaped pressing body 204 and the right arc-shaped pressing body 205 are structures convex in the center and concave at the two ends, two bosses are a left arc-shaped pressing sharp handle 200 and a right arc-shaped pressing sharp handle 201, the left arc-shaped pressing sharp handle 200 and the right arc-shaped pressing sharp handle 201 are cuboids with a length of 2 cm and a width of 1 cm, a transverse frame connecting shaft 203 is in a cylinder structure with a diameter of 2 cm and a length of 8 cm, a tightness control cap 202 has an inner diameter of 2 cm and an outer diameter of 2.5 cm, and the tightness control cap 202 with an inner diameter of 2 cm and an outer diameter of 2.5 cm may control the movement of the left arc-shaped pressing sharp handle 200 and the right arc-shaped pressing sharp handle 201 on the transverse frame connecting shaft 203 with a diameter of 2 cm and a length of 8 cm, so that the GJJV tight-buffered sensing fiber 206 is fixed in the arc-shaped cavity through the convex structure of the left arc-shaped pressing body 204 and the right arc-shaped pressing body 205.

An application method of the above temperature interference-free sensing fiber monitoring apparatus comprises the following steps.

(1) Determine the Number of the Apparatus and the Length of the Sensing Fiber

A region to be monitored on the surface of the hydraulic concrete construction is a 100 m×100 m plane region, and the application state of the apparatus is as shown in FIG. 1. The apparatus is levelly placed in the plane region, it is planned to use the sensing fiber with a length of 500 m, and 10 apparatuses are determined to be used in the 500 m sensing fiber based on the previous monitoring condition and construction state of the structure at the moment, and in order to better describe the running detail of the apparatus, one of the apparatuses is preferably selected for detailed discussion.

(2) Configure Modules in the Apparatus

Firstly, the vacuum cavity module, the composite material flat groove module and the port fiber-fixing module are assembled according to the basic structure of the apparatus according to the present invention, and a certain quantity of the GJJV tight-buffered sensing fiber 206 are prepared, wherein the basic configuration principle is to firstly configure the port fiber-fixing module, then configure the vacuum cavity module, and finally configure the composite material flat groove module; however, for each single module, it is configured by mainly using the principle from bottom to top and from left to right.

(3) Thread and Fix the Sensing Fiber Initially

The GJJV tight-buffered sensing fiber 206 is passed through each member in the port fiber-fixing module, the vacuum cavity module and the composite material flat groove module in sequence, the transverse frame connecting shaft with a diameter of 2 cm and a height of 8 cm is rotated to connect the left arc-shaped pressing sharp handle 200 with a length of 2 cm and a width of 1 cm and the right arc-shaped pressing sharp handle 201 with a length of 2 cm and a width of 1 cm to the transverse frame connecting shaft 203 with a diameter of 2 cm and a length of 8 cm in series, the tightness control cap 202 with an inner diameter of 2 cm and an outer diameter of 2.5 cm on the transverse frame connecting shaft 203 is rotated, the tightness control cap 202 is controlled to be rotated inwardly, and the GJJV tight-buffered sensing fiber 206 is fixed in a arc-shaped pressing cavity 207 through the bulge between the left arc-shaped pressing body 204 with a radian of π/3 and the right arc-shaped pressing body 205 with a radian of π/3.

(4) Acquire the Numerical Value Monitored by the First Temperature Interference-Free Sensing Fiber for the First Time The cover plate is fixed in the installation tube through glue and the glue is injected in the hole through which the sensing fiber on the cover plate passes to form a sealed cavity; at the moment, the GJJV tight-buffered sensing fiber 206 in the vacuum cavity section is in a state without external temperature interference, and the value at this moment is recorded as the numerical value monitored by the temperature interference-free sensing fiber for the first time.

(5) Acquire the Numerical Value Monitored by the Temperature Interference-Free Sensing Fiber for the Second Time The product of the difference between the thermal expansion coefficient of the cylinder 219 made of special resin matrix composite material in the installation tube and the thermal expansion coefficient of the GJJV tight-buffered sensing fiber 206 in the cylinder 219 made of special resin matrix composite material with the strain value of the corresponding section of the GJJV tight-buffered sensing fiber 206 is equal to the temperature coefficient of the corresponding section of the GJJV tight-buffered sensing fiber 206, and quick setting glue is injected in the arc-shaped concavoconcave glue-injection groove to make the vacuum cavity 216 in a full vacuum or accurate vacuum state; moreover, the GJJV tight-buffered sensing fiber 206 passing through this portion is also fixed, and at the moment, the strain numerical value generated by the external load acquired by the GJJV tight-buffered sensing fiber 206 of the cylinder 219 is the numerical value after the effect of removing the temperature interference, and is recorded as the strain numerical value monitored by the temperature interference-free sensing fiber for the second time.

(6) Acquire the Numerical Value Finally Monitored by the Temperature Interference-Free Sensing Fiber The average value of the strain numerical value generated by the external load and monitored by the sensing fiber in the vacuum cavity and the cylinder 219 is calculated, the step (4) and the step (5) are continuously repeated to seal other apparatuses, the result of the average value of the strain numerical values generated by the external load and monitored by the GJJV tight-buffered sensing fiber 206 of the cylinder 219 complies with the normal distribution law, and the numerical value of a place corresponding to the maximum probability is used as a final monitoring result.

The description above is only the preferable embodiment of the present invention, and it should be noted that those skilled in the art may make a plurality of improvements and decorations without departing from the principle of the present invention, and these improvements and decorations shall also fall within the protection scope of the present invention.

The invention claimed is:

1. A temperature interference-free sensing fiber monitoring apparatus, comprising a vacuum cavity module, a composite material flat groove module and a port fiber-fixing module, wherein the vacuum cavity module is connected with the composite material flat groove module, the port fiber-fixing module is connected with the vacuum cavity module via a foursquare plug body, a sensing fiber orderly passes through the composite material flat groove module, the vacuum cavity module and the port fiber-fixing module, the vacuum cavity module, the composite material flat groove module and the port fiber-fixing module are all fixed in an installation tube, and the installation tube is located on a temperature interference-free base platform;

the composite material flat groove module comprises a cylinder made of special composite material, a center of the cylinder is provided with a through hole for the sensing fiber to pass through, a top of the cylinder is provided with a pressing cover, and a center of the pressing cover is provided with a concavoconcave glue-injection groove;

the vacuum cavity module comprises a vacuum cavity and an elastic fastening outer ring, one end of the vacuum cavity is connected with a cover plate, the cover plate is fixed in an installation tube through glue, the other end of the vacuum cavity is connected with the elastic fastening outer ring, the center of the elastic fastening outer ring is provided with a circular hole, the circular hole is internally provided with a hard fiber protection outer layer, the bottom end of the elastic fastening outer ring is provided with a conical hole, the conical hole is internally installed with the foursquare plug body, the foursquare plug body is extended with a cylindrical boss, the cylindrical boss is located in the hard fiber protection outer layer, the sensing fiber passes through the cylindrical boss, the vacuum cavity is connected with a vacuum-pumping apparatus outside the installation tube, and the sensing fiber passes through the cover plate, the vacuum cavity and the foursquare plug body in sequence; and the port fiber-fixing module comprises a left arc-shaped pressing body and a right arc-shaped pressing body, one end of the left arc-shaped pressing body and one end of the right arc-shaped pressing body are respectively hinged with the bottom end of the elastic fastening outer ring, the other end of the left arc-shaped pressing body and the other end of the right arc-shaped pressing body are respectively extended with a boss, the boss is provided with a connecting apparatus, the arc-shaped surfaces of the left arc-shaped pressing body and the right arc-shaped pressing body are set oppositely, the left arc-shaped pressing body and the right arc-shaped pressing body form an arc-shaped pressing cavity, and the sensing fiber passes through the arc-shaped pressing cavity.

2. The temperature interference-free sensing fiber monitoring apparatus according to claim 1, wherein the vacuum-pumping apparatus comprises a vacuum pump and an air valve, the vacuum cavity is connected with the air valve through a pipeline, and the vacuum pump is installed in the air valve.

3. The temperature interference-free sensing fiber monitoring apparatus according to claim 2, wherein a vacuum degree sensor is installed in the pipeline.

4. The temperature interference-free sensing fiber monitoring apparatus according to claim 1, wherein the connecting apparatus comprises a transverse frame connecting shaft, both of the two bosses are provided with a through hole, and the transverse frame connecting shaft is locked by a tightness control cap after passing through the two through holes.

5. The temperature interference-free sensing fiber monitoring apparatus according to claim 1, wherein a numerical value of the product of a difference between a thermal expansion coefficient of the cylinder and the thermal expansion coefficient of the sensing fiber in the cylinder with a strain value of a corresponding section of sensing fiber is no more than 1.03 times of the numerical value of a temperature coefficient of the corresponding section sensing fiber.

6. The temperature interference-free sensing fiber monitoring apparatus according to claim 1, wherein two sides of the temperature interference-free base platform are provided with a clamping groove.

7. An application method of a temperature interference-free sensing fiber monitoring apparatus according to claim 1, comprising the following steps of:

first step: configuring a sensing fiber used for distributed monitoring, firstly passing the sensing fiber through the port fiber-fixing module, the vacuum cavity module and the composite material flat groove module in sequence, and then leading the sensing fiber led out into a second temperature interference-free sensing fiber monitoring apparatus to pass through the composite material flat groove module, the vacuum cavity module and the port fiber-fixing module in sequence;

second step: connecting the respective boss of the left arc-shaped pressing body and the right arc-shaped pressing body to a transverse frame connecting shaft in series through the transverse frame connecting shaft, rotating a tightness control cap on the transverse frame connecting shaft, controlling the tightness control cap to rotate inwardly, and fixing the sensing fiber in the arc-shaped pressing cavity through a bulge between the left arc-shaped pressing body and the right arc-shaped pressing body to form a vibration wire form;

third step: configuring a hard fiber protection outer layer and the elastic fastening outer ring from inside to outside, fixing the cover plate in the installation tube through glue to form an airtight cavity, and fixing the sensing fiber on the cover plate through glue as well, wherein a vacuum cavity section is in an external temperature interference-free state at the moment, a stress-strain numerical value obtained in the vacuum cavity section is a numerical value after removing a temperature interference effect, and recorded as a strain numerical value monitored by a temperature interference-free sensing fiber for the first time;

fourth step: placing the cylinder on the cover plate, wherein a product of a difference between a thermal expansion coefficient of the special composite material of the cylinder and the thermal expansion coefficient of the sensing fiber in the special composite material with a strain value of a corresponding section of sensing fiber is no more than 1.03 times of a temperature coefficient of the corresponding section of sensing fiber; and injecting glue in the concavoconcave glue-injection groove to fix the sensing fiber passing through the concavoconcave glue-injection groove, wherein the stress-strain numerical value generated by an external load and obtained by the sensing fiber in the cylinder at the moment is the numerical value after removing the temperature interference effect, and is recorded as the strain numerical value monitored by the temperature interference-free sensing fiber monitoring for the second time; and fifth step: getting an average value of the numerical value generated by the external load and monitored by the sensing fiber in the vacuum cavity and the cylinder, repeating the third step and the fourth step, obtaining the average value of multiple groups of strain numerical values, wherein the result of the average value of the strain numerical values complies with a normal distribution law, and the numerical value of a place corresponding to the maximum probability is used as a final monitoring result.

\* \* \* \* \*